(12) United States Patent
Bieberstein

(10) Patent No.: US 9,828,734 B1
(45) Date of Patent: Nov. 28, 2017

(54) PET WASTE COLLECTION AND DISPOSAL DEVICE

(71) Applicant: Tammy Lynn Bieberstein, Madison, WI (US)

(72) Inventor: Tammy Lynn Bieberstein, Madison, WI (US)

( * ) Notice: Subject to any disclaimer, the term of this patent is extended or adjusted under 35 U.S.C. 154(b) by 0 days.

(21) Appl. No.: 15/402,656

(22) Filed: Jan. 10, 2017

(51) Int. Cl.
*A01K 29/00* (2006.01)
*E01H 1/12* (2006.01)
*A01K 23/00* (2006.01)

(52) U.S. Cl.
CPC ......... *E01H 1/1206* (2013.01); *A01K 23/005* (2013.01); *E01H 2001/1266* (2013.01)

(58) Field of Classification Search
CPC .......... E01H 1/1206; E01H 2001/1266; A01K 23/005
USPC .................................................... 294/1.3–1.5
See application file for complete search history.

(56) References Cited

U.S. PATENT DOCUMENTS

| 4,852,924 | A  * | 8/1989  | Ines    | A01K 23/005 294/1.5 |
| 6,942,264 | B1 * | 9/2005  | Mendez  | A01K 23/005 294/1.5 |
| 7,431,361 | B2 * | 10/2008 | Pilas   | A01K 23/005 294/1.5 |
| 7,934,337 | B1 * | 5/2011  | Lambert | A01K 77/00 43/11 |
| 8,177,270 | B2 * | 5/2012  | Chen    | A01K 23/005 294/1.4 |
| 8,544,907 | B2 * | 10/2013 | Powell  | A01K 23/005 294/1.5 |

* cited by examiner

*Primary Examiner* — Stephen Vu
(74) *Attorney, Agent, or Firm* — Craig A. Fieschko, Esq.; DeWitt Ross & Stevens S.C.

(57) ABSTRACT

A pet waste collector includes an elongated handle extending between a rear end and a front end, a loop situated forwardly of the front end configured so that a waste disposal bag can be fit within the loop, and a (preferably bendable) stem situated between the handle front end and the loop. A pet owner can grasp the handle and situate the loop (and the bag therein) beneath the rear of a dog as the dog squats to excrete waste, thereby catching the waste within the bag. The waste-filled bag may then be removed from the loop for disposal. Bending the stem allows the loop (and bag) to be oriented as the pet owner desires for visibility, and for ease of catching the waste.

25 Claims, 1 Drawing Sheet

PET WASTE COLLECTION AND DISPOSAL DEVICE

FIELD OF THE INVENTION

This document concerns an invention relating generally to pet waste collection devices.

BACKGROUND OF THE INVENTION

Few dog owners enjoy dealing with their dogs' waste. Once a dog deposits its waste, a common approach for collecting and disposing of it is to place a plastic bag over the waste, grasp the waste within the bag with one hand from the outside of the bag, and then twist the bag's neck with the other hand to close the waste within the bag. Many dog owners dislike this approach because grasping the dog waste, even through the bag, is unpleasant, particularly if the waste is soft. Grasping the waste through a bag can also be difficult and unpleasant if the waste is resting in a wet and/or inconvenient area, such as in a puddle, or in grass or on another irregular surface. Additionally, dog owners must bend down to retrieve the waste, which can be difficult for some owners.

Devices for assisting with dog waste collection, often referred to as "pooper scoopers," are also available. A common type involves a bin/container with an elongated handle oriented generally perpendicularly to the open mouth of the bin/container, such that a dog owner can use the handle to place the bin/container with its open mouth next to the waste. A small rake or similar implement can then be used to push the waste into the bin/container for subsequent disposal. Another type of "pooper scooper" which has become popular in recent years is in for form of a pair of jaws at the end of a handle, with a lever or other actuator near the end of the jaws so that a dog owner can close the jaws about deposited waste, transport the collected waste to a garbage can or other disposal site, and then open the jaws to discard the waste. However, such "pooper scoopers" are often disliked because they collect waste on their surfaces, making them undesirable for storage within the owner's household. These devices can also be difficult to use adjacent obstructions and/or on grass or other irregular surfaces, and can be unpleasant to carry and store if they get wet, as when waste is retrieved from wet grass or a puddle.

The foregoing methods of waste collection—both bagging and use of a "pooper scooper"—also have the disadvantage that waste can remain on the ground after collection. This can pose a hazard for children and others who sit, play, or otherwise contact the ground where the waste was deposited.

SUMMARY OF THE INVENTION

The invention involves a pet waste collection device which is intended to at least partially solve the aforementioned problems. To give the reader a basic understanding of some of the advantageous features of the invention, following is a brief summary of preferred versions of the device, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

An exemplary preferred version of the pet waste collection device is illustrated in the accompanying FIGS. 1-3, wherein the overall device is generally designated by the reference numeral 100, and is shown with a handle 104, a stem 108, and a loop 120 configured to receive a bag 200 (shown installed in the loop 120 in FIGS. 2-3, wherein the loop 120 is not visible as it is covered by the bag 200). To briefly explain the usage of the pet waste collector 100, when the pet waste collector 100 is in the state shown in FIG. 2 or FIG. 3, a user may grasp the handle 104 and situate the loop 120 (and the bag 200 therein) below their pet's rear as the pet squats to defecate. The pet's waste falls through the loop 120 and into the bag 200, which may then be removed from the loop 120 and discarded. The pet owner therefore need not squat down, rummage through grass or other ground material, and handle the waste through a bag or otherwise. Moreover, no ground contamination from pet waste results. Each of the handle 104, stem 108, loop 120, and bag 200 will now be discussed in greater detail in turn.

The handle 104 is elongated, and has a lengthwise axis extending between a rear handle end 102 and a front handle end 106. The handle 104 may be extensible, for example by forming it of interfitting handle sections 104A, 104B, and 104C, wherein the handle sections are telescopically extensible and collapsible between the states shown in FIG. 1 and FIGS. 2-3. A pet owner may therefore carry the pet waste collector 100 in a collapsed state, and extend it for easier positioning beneath the pet when waste is to be collected.

The stem 108 extends forwardly of the front handle end 106 to the loop 120, and preferably has a rear stem section 112 extending downwardly from the lengthwise axis of the handle 104, and a front stem section 116 extending upwardly from the rear stem section 112 to the loop 120. A V-bend 114 is defined in the stem 108 between the rear stem section 112 and the front stem section 116. The stem 108 is bendable, for example at the V-bend 114, at the juncture 110 between the handle 104 and the rear stem section 112, and/or at the juncture 118 between the front stem section 116 and the loop 120, whereby the position of the loop 120 may be adjusted with respect to the handle 104 (as seen in FIGS. 2-3, wherein FIG. 3 shows the orientation of the loop 120 with respect to the handle 104 changed from the orientation of FIG. 2, owing to adjustment of the "joints" at 110, 114, and 118 in FIG. 2). The provision of these joints 110, 114, and 118 bounding the rear stem section 112 and front stem section 116 allows adjustment of both the angle and the distance between the plane of the loop 120 and the lengthwise axis of the handle 104, whereby the position and orientation of the loop 120 can be better adjusted to suit the pet owner's preferences (which may vary between pet owners of different heights and capabilities, and having differently-sized pets).

The loop 120, which is only visible in FIG. 1, is affixed to the handle 104 via the stem 108 to rest forwardly of the front handle end 106. The loop 120 is preferably oriented along a plane situated at an angle of 60 degrees or less with respect to the lengthwise axis of the handle 104, with FIG. 1 showing the loop 120 oriented at least substantially parallel to the lengthwise axis of the handle 104, and FIG. 3 showing an arrangement wherein the loop 120 (which is covered by the bag 200) is oriented at an angle of approximately 30 degrees with respect to the lengthwise axis of the handle 104. The loop 120 preferably encloses an area of at least 10 square inches (with an area of 15-36 square inches being preferred), and has a width (as measured in a direction perpendicular to the lengthwise axis of the handle 104) of preferably no more than six inches. The loop 120 preferably bears a net 122 having perforated surfaces extending downwardly from a net mouth 124 to a net bottom 126, with the net 122 being affixed to the loop 120 at or adjacent the net mouth 124. Thus, when the bag 200 is installed within the loop 120 as shown in FIGS. 2-3, the bag 200 is situated to rest within the net 122. The net 122, while not necessary for the pet waste collector 100, usefully supports the bag 200 as waste falls therein, preventing the bag 200 from falling from the loop 120.

The bag 200 may be any bag selected by the pet owner, preferably one having continuous surfaces extending downwardly from a bag mouth 202 to a bag bottom 204. Conventional disposable plastic bags are well-suited for use with the pet waste collector 100, including leftover plastic bags from bread or other foodstuffs, and bags provided by retail stores to carry purchases therefrom. The bag 200 may be affixed to the loop 120 at or adjacent the bag mouth 202 with the bag bottom 204 being spaced from the loop 120. The bag 200 may simply be affixed to the loop 120 by draping its bag mouth 202 about the exterior of the loop 120 as shown in FIGS. 2-3, and perhaps gathering the bag mouth 202 thereafter and twisting or tying a portion of its circumference.

As briefly outlined above, to use the pet waste collector 100 as shown in FIGS. 2-3, a pet owner may grasp the handle 104 and position the loop 120 beneath a pet to collect waste falling from the pet, with the waste being collected in the bag 200. The pet owner may then remove the bag 200 (and the waste therein) from the loop 120 and dispose of it appropriately. The pet owner never needs to feel or handle the waste, or bend or squat to collect it, and the waste need never touch the ground. Owing to the elongated handle 104, the pet owner may also use the pet waste collector 100 to catch waste from a pet while standing on a sidewalk or other pathway once a pet leaves the pathway to relieve itself. The pet owner therefore reduces the risk of stepping in waste previously left by other owners' pets, a risk which is unfortunately high in some dog parks and urban areas.

Further features, advantages, and objects of the invention will be apparent from the remainder of this document in conjunction with the associated drawings.

DETAILED DESCRIPTION OF EXEMPLARY VERSIONS OF THE INVENTION

Figure 1:
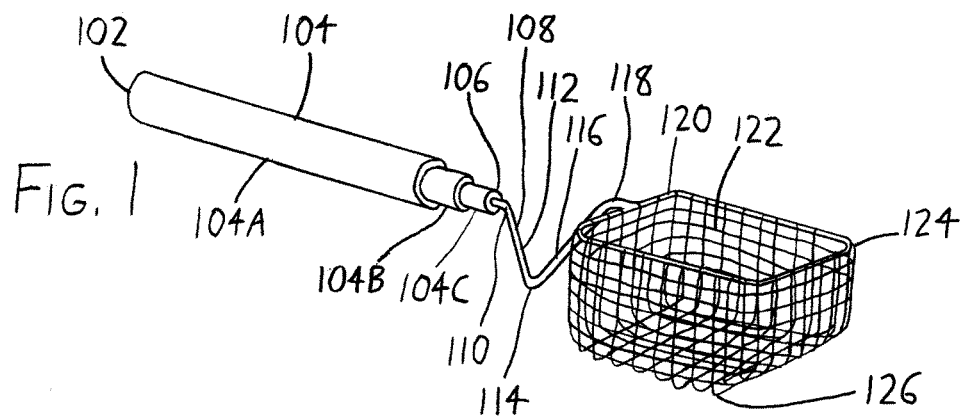
FIG. 1 is a perspective view of an exemplary version of the pet waste collector 100, shown with its handle 104 in a collapsed/retracted state.

Expanding on the discussion above, the pet waste collector 100 may be constructed of any suitable materials. The handle 104 is preferably constructed of lightweight metal (e.g., aluminum) or plastic. The stem 108 is preferably formed of bendable wire, preferably coated with flexible material (e.g., vinyl) or otherwise being rendered corrosion-resistant, and may be force-fit, adhesively joined, or otherwise affixed within or to the handle 104 (more particularly, its frontmost handle section 104C). The loop 120 is preferably similarly formed of corrosion-resistant wire, with its net 122 preferably being formed of fabric, or flexible mesh/webbing, which may be sewn to the loop 120 at or adjacent the net mouth 124.

Similarly, the pet waste collector 100 may be formed with any suitable dimensions. The handle 104 is preferably 3 to 6 feet long, or is extensible to such a length. The stem 108 is preferably 6 to 10 inches long overall, and where it is provided in the form of discrete rear and front stem sections 112 and 116, the front stem section 116 is preferably slightly longer than the rear stem section 112, e.g., the front stem section 116 may measure approximately 4 inches and the rear stem section 112 may measure approximately 3 inches. In this manner, when the stem 108 is in a more folded/retracted state, with the rear and front stem sections 112 and 116 closer to a parallel relationship and with the loop 120 situated closer to the handle 104. This arrangement makes it easier for a pet owner to adjust the rear and front stem sections 112 and 116 such that the plane of the loop 120, or at least the joint 118 between the front stem section 116 and the loop 120, is situated slightly above the lengthwise axis of the handle 104. This increases the visibility of the loop 120 when the pet waste collector 120 is in use, making it easier to properly situate the loop 120 to catch waste falling from a pet's rear. As noted above, the loop 120 preferably has a width of six inches or less so that it is easily situated between the rear legs of most dogs (though it may be sized differently for smaller or larger dogs), with the length of the loop 120 (in the rearward-forward direction) preferably being the same or slightly greater than the width.

Figure 2:
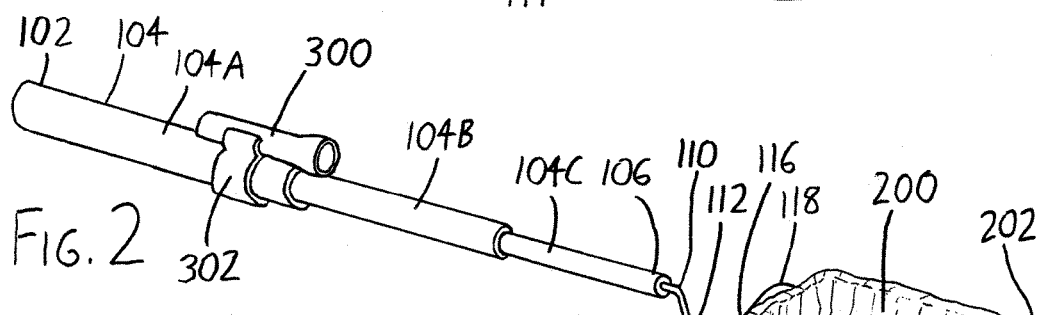
FIG. 2 depicts the pet waste collector 100 of FIG. 1 with its handle 104 in an extended state (and with an optional flashlight 300 shown affixed to the handle 104 via a clip 302), and with a bag 200 installed within its loop 120 and associated net 122.
Figure 3:
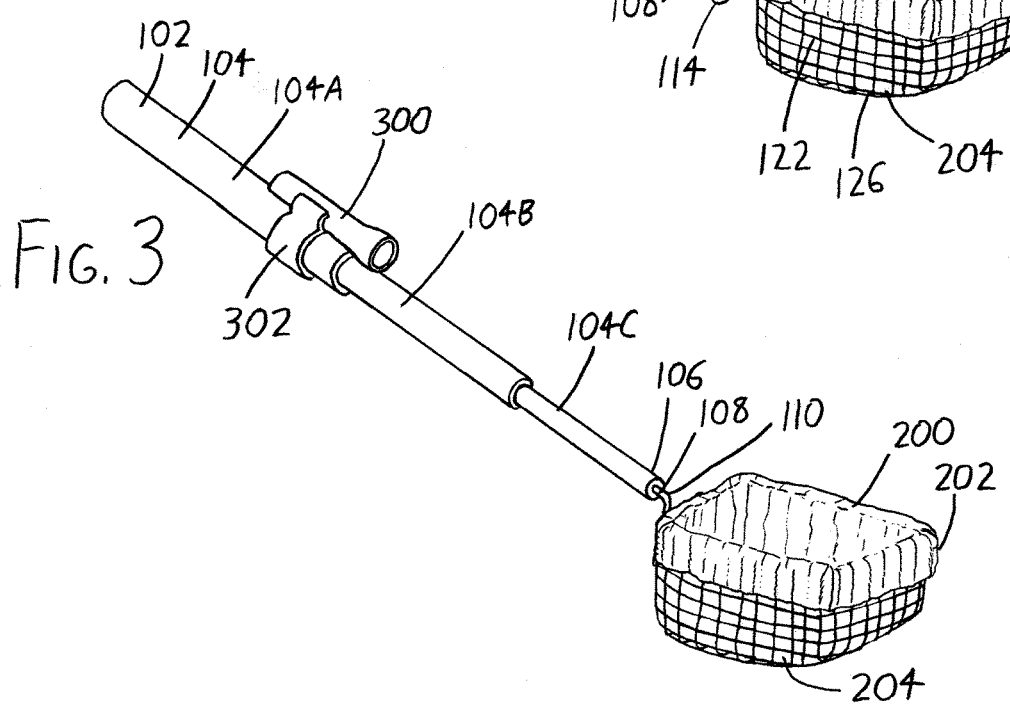
FIG. 3 depicts the pet waste collector 100 of FIG. 2 with its stem 108 bent at the joints 114, 110, and 118 to reorient the loop 120 (and the bag 200 therein) with respect to the handle 104 for potentially easier collection of waste falling from a dog or other pet.

The pet waste collector 100 may also include optional features, such as the flashlight 300 shown in FIGS. 2-3 and briefly noted above. The flashlight 300 is a conventional battery-powered flashlight which can be mounted to the handle 104 in such a manner that it illuminates the loop 120 when the pet waste collector 100 is in use, as by mounting the flashlight 300 to the handle via the clip 302. The clip 302 is configured as a collar which fits over the handle 104 and removably receives the flashlight 300 between a pair of opposing resiliently flexible curved arms between which the body of the flashlight 300 may be complementarily received. Other means of mounting the flashlight 300 to the pet waste collector 100 may be used instead. The handle 104 can also include other features, such as a wrist strap at the rear handle end 102, and/or a compartment (e.g., defined as a bore at the rear handle end 102) wherein one or more bags 200 may be stored, and removed as needed. (Typically, only a single bag 200 is needed each time the pet waste collector 100 is used, though a user might wish to have spare bags 200 on hand for future use.)

The pet waste collector 100 may also include additional means for affixing the bag 200 within the loop 120. As an example, the bag 200 may be secured within the loop 120 by using one or more clips (not shown), such as common office binder clips, to affix one or more sections of the bag 200 about the circumference of the loop 120, and/or to the front stem section 116.

It is emphasized that the pet waste collector 100 may be configured differently from the version shown in FIGS. 1-3, such that it has vastly different appearance. The handle 104 need not be formed in telescoping sections as seen in FIGS. 1-3, and could simply be formed as a unitary pole or other structure. A secondary handle resembling an upwardly protruding shaft or "T" could be provided closer to the front handle end 106 than the rear handle end 102 so that a pet owner may more easily manipulate/orient the pet waste collector 100 when grasping the handle 104 near the rear handle end 102 with one hand, and grasping the secondary handle with the other hand. The stem 106 need not be formed as shown, and could simply be provided as a (preferably bendable) juncture or length of material between the handle 104 and the loop 120. While the loop 120 is shown with a roughly rectangular shape in FIGS. 1-3, it may have other shapes instead, with a roughly oval shape being particularly preferred, and with the major axis of the oval being oriented in the rearward-forward direction of the pet waste collector 100. This arrangement allows a pet owner to more easily stretch or compress the loop 120 at its major or minor axis, thereby customizing the loop 120 with a width and configuration which is optimized to catch waste from the pet owner's dog or other pet. The net 122 need not be included, and if included, it could be provided as a rigid basket-like structure rather than a flexible web-like one. If the net 122 has a perforated surface rather than a continuous one, the perforation density could be less than that shown, for example, it might simply be formed of one or more straps that extend between opposite sides of the loop 120 and serve to support the bottom of the bag 200.

While the pet waste collector 100 has generally been described above as being used for collection of dog waste, it can be used for collection of waste from any other animals as well.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:
1. A pet waste collector including:
  a. an elongated handle extending between a rear handle end and a forward handle end, the handle having a lengthwise axis,
  b. a loop oriented along a plane situated at an angle of 60 degrees or less with respect to the lengthwise axis of the handle,
  c. a stem extending between the forward handle end and the loop, the stem having:
    (1) a rear stem section extending downwardly from the lengthwise axis of the handle, and
    (2) a forward stem section extending upwardly from the rear stem section to the loop, wherein the stem is bendable, whereby the position of the loop may be adjusted with respect to the handle,
  whereby a user may:
  i. fit a bag having a bag mouth into the loop, with the bag being affixed to the loop at or adjacent to the bag mouth, and
  ii. grasp the handle and position the loop beneath a pet to collect waste falling from the pet, the waste being collected in the bag.
2. The pet waste collector of claim 1 wherein a V-bend is defined in the stem between the rear stem section and the forward stem section.
3. The pet waste collector of claim 1 wherein the loop has a width:
  a. oriented in a direction perpendicular to the lengthwise axis of the handle, and
  b. being no greater than six inches.
4. The pet waste collector of claim 3 wherein the loop encloses an area of at least 10 square inches.
5. The pet waste collector of claim 1:
  a. further including a net having perforated surfaces extending downwardly from a net mouth to a net bottom,
  b. wherein the net is affixed to the loop at or adjacent the net mouth.
6. The pet waste collector of claim 1:
  a. further including a bag having continuous surfaces extending downwardly from a bag mouth to a bag bottom,
  b. wherein the bag is affixed to the loop at or adjacent the bag mouth, with the bag bottom being spaced from the loop.
7. The pet waste collector of claim 6:
  a. further including a net having perforated surfaces extending downwardly from a net mouth to a net bottom,
  b. wherein the net is affixed to the loop at or adjacent the net mouth, and
  c. wherein the bag is situated within the net.
8. The pet waste collector of claim 1 wherein the handle is formed of interfitting handle sections, the handle sections being telescopically extensible and collapsible.
9. The pet waste collector of claim 1 wherein bendable joints are situated between one or more of:
  a. a juncture between the rear stem section and the forward stem section,
  b. a juncture between the handle and the rear stem section, and
  c. a juncture between the forward stem section and the loop.
10. The pet waste collector of claim 1 wherein the loop is bendable, whereby the user may reconfigure the shape of the loop.
11. A pet waste collector including:
  a. an elongated handle extending between a rear handle end and a forward handle end, the handle having a lengthwise axis,
  b. a loop oriented along a plane situated at an angle of 60 degrees or less with respect to the lengthwise axis of the handle,
  c. a stem extending between the forward handle end and the loop, the stem having:
    (1) a rear stem section extending downwardly from the lengthwise axis of the handle, and
    (2) a forward stem section extending upwardly from the rear stem section to the loop,
    wherein bendable joints are situated between one or more of:
    (a) a juncture between the rear stem section and the forward stem section,
    (b) a juncture between the handle and the rear stem section, and
    (c) a juncture between the forward stem section and the loop,
  whereby a user may:
  i. fit a bag having a bag mouth into the loop, with the bag being affixed to the loop at or adjacent to the bag mouth, and
  ii. grasp the handle and position the loop beneath a pet to collect waste falling from the pet, the waste being collected in the bag.
12. The pet waste collector of claim 11 wherein the loop is bendable, whereby the user may reconfigure the shape of the loop.
13. A pet waste collector including:
  a. an elongated handle extending between a rear handle end and a forward handle end, the handle having a lengthwise axis,
  b. a loop oriented along a plane situated at an angle of 60 degrees or less with respect to the lengthwise axis of the handle, wherein the loop is bendable, whereby the user may reconfigure the shape of the loop, c. a stem extending between the forward handle end and the loop, the stem having:
   (1) a rear stem section extending downwardly from the lengthwise axis of the handle, and
   (2) a forward stem section extending upwardly from the rear stem section to the loop, whereby a user may:
   i. fit a bag having a bag mouth into the loop, with the bag being affixed to the loop at or adjacent to the bag mouth, and
   ii. grasp the handle and position the loop beneath a pet to collect waste falling from the pet, the waste being collected in the bag.

14. A pet waste collector including:
   a. an elongated handle extending between a rear handle end and a forward handle end, the handle having a lengthwise axis,
   b. a loop having a width:
      (1) oriented in a direction perpendicular to the lengthwise axis of the handle,
      (2) being no greater than six inches,
   c. a stem extending forwardly of the forward handle end to the loop, the stem:
      (1) having a V-bend therein, and
      (2) being bendable whereby the position of the loop may be adjusted with respect to the handle.

15. The pet waste collector of claim 14 wherein the stem includes:
   a. a rear stem section extending downwardly from the lengthwise axis of the handle, and
   b. a forward stem section extending upwardly from the rear stem section to the loop, with the rear and forward stem sections defining the V-bend.

16. The pet waste collector of claim 15 wherein bendable joints are situated between one or more of:
   a. a juncture between the rear stem section and the forward stem section,
   b. a juncture between the handle and the rear stem section, and
   c. a juncture between the forward stem section and the loop.

17. The pet waste collector of claim 14:
   a. further including a bag having continuous surfaces extending downwardly from a bag mouth to a bag bottom,
   b. wherein the bag is affixed to the loop at or adjacent the bag mouth, with the bag bottom being spaced from the loop.

18. The pet waste collector of claim 14 wherein the loop is bendable, whereby the user may reconfigure the shape of the loop.

19. A pet waste collector including:
   a. an elongated handle extending between a rear handle end and a forward handle end, the handle having a lengthwise axis,
   b. a loop affixed to the handle forwardly of the forward handle end, the loop enclosing an area of at least 10 square inches,
   c. a stem defined by:
      (1) a rear stem section extending downwardly from the lengthwise axis of the handle, and
      (2) a forward stem section extending upwardly from the rear stem section to the loop, and
      (3) a V-bend defined in the stem between the rear stem section and the forward stem section,
   d. a bag having continuous surfaces extending downwardly from a bag mouth to a bag bottom, wherein the bag is affixed to the loop at or adjacent the bag mouth with the bag bottom being spaced from the loop.

20. The pet waste collector of claim 19 wherein the loop is oriented along a plane situated at an angle of 60 degrees or less with respect to the lengthwise axis of the handle.

21. The pet waste collector of claim 20 wherein the loop has a width:
   a. oriented in a direction perpendicular to the lengthwise axis of the handle, and
   b. being no greater than six inches.

22. The pet waste collector of claim 19 wherein the stem is bendable, whereby the position of the loop may be adjusted with respect to the handle.

23. The pet waste collector of claim 19 wherein the stem is bendable, whereby the position of the loop may be adjusted with respect to the handle.

24. The pet waste collector of claim 19 wherein the loop is bendable, whereby the user may reconfigure the shape of the loop.

25. The pet waste collector of claim 19 wherein bendable joints are situated between one or more of:
   a. a juncture between the rear stem section and the forward stem section,
   b. a juncture between the handle and the rear stem section, and
   c. a juncture between the forward stem section and the loop.

* * * * *